United States Patent [19]
Reichen

[11] 4,150,884
[45] Apr. 24, 1979

[54] MOTION-PICTURE CAMERA

[75] Inventor: Willi Reichen, Yvonand, Switzerland

[73] Assignee: Bolex International SA, Ste.-Croix, Switzerland

[21] Appl. No.: 791,208

[22] Filed: Apr. 27, 1977

[30] Foreign Application Priority Data

Apr. 30, 1976 [CH] Switzerland ............... 005445/76

[51] Int. Cl.² ............................................. G03B 21/36
[52] U.S. Cl. ................................. 352/91 C; 352/27; 352/72
[58] Field of Search ............... 352/27, 91 R, 91 C, 352/91 S, 72

[56] References Cited

U.S. PATENT DOCUMENTS

| T920,009 | 3/1974 | Kosarko | 352/72 |
|---|---|---|---|
| 3,635,549 | 1/1972 | Stieringer | 352/91 S |
| 4,065,209 | 12/1977 | Freudenschuss | 352/91 C |

*Primary Examiner*—Monroe H. Hayes
*Attorney, Agent, or Firm*—Montague & Ross

[57] ABSTRACT

A motion-picture camera optionally loadable with silent-film and sound-film cassettes has a reversible film-feeding mechanism including a reciprocable transport claw and a catch engageable with a takeup reel through a coupling within the cassette including a rewind stop. A spring-loaded stud close to the catch enables the rewind stop to be disengaged in a sound-film camera whereby the film can be transported backward for trick cinematography such as superposition of scenes. During the first run of such a double exposure, a step-down transmission can be activated to slow the windup of the film within its cassette if the latter is of the silent-film type, thereby creating a reserve length of film that can be rewound on the supply reel. In the presence of a sound-film cassette, as determined by a sensor which could be the aforementioned stud, this stepdown transmission is disabled inasmuch as the disengagement of the rewind stop allows the film to be reverse-driven without such reserve length.

11 Claims, 6 Drawing Figures

MOTION-PICTURE CAMERA

FIELD OF THE INVENTION

My present invention relates to a motion-picture camera which can optionally loaded with silent-film cassettes and sound-film cassettes.

BACKGROUND OF THE INVENTION

The two types of cassettes referred to, aside from being usually distinguishable by their size, also differ in the way that the film is guided from a supply reel to a takeup reel. Thus, a silent-film cassette generally has only one location at which the film is accessible, i.e. the area which in operation confronts the image gate of the camera while a reciprocating transport claw engages in the perforations of the accessible film portion; in a sound-film cassette, on the other hand, there is also provided a cutout which the film reaches after passing the image gate and where that film is entrained by a rotating capstan and a coacting pressure roller past a recording head. Conventionally, cassettes of both types also have laterally accessible hubs by which their takeup reels can be driven through a catch within the camera operating concurrently with the transport claw. In order to prevent accidental reverse rotation of the takeup reel, especially upon removal of the cassette from the camera when such reverse rotation could expose a previously wound-up film portion to ambient light, the hub of that reel is normally provided with a rewind stop such as a pawl engaging a ratchet.

In certain instances, especially for the purpose of trick cinematography, it is desirable to rewind short stretches of film on the supply reel for a second exposure. Because of the aforementioned stop, such rewinding is possible with the usual cassette only if a reserve length of film is accumulated within the cassette downstream of the exposure gap. To this end it has already been proposed to slow down or possibly arrest the takeup reel during the first run of a double exposure under the control of a suitably programmed sequence switch; in a second stage of the program, while the slowdown or standstill of the takeup reel continues, the accumulated extra stretch is reverse-transported past the image gate (usually with obstruction of that gate by the camera shutter or by a diaphragm) whereas in the third stage the film is again advanced under normal wind-up conditions for another exposure. The various program steps, including the retardation or deactivation of the windup drive in the first stage, can be implemented by a set of cams controlled by a three-position selector.

The aforedescribed mode of operation is rather impractical in the case of a sound-film cassette since the reserve length of film tends to accumulate within the cutout provided for sound recording, thereby risking entanglement with the recording mechanism. It is therefore already been proposed to limit the use of such a double-exposure program to silent-film cassettes and to disable the corresponding sequence switch or selector when the camera is loaded with a sound-film cassette. Though this solution obviates the risk of damage to a sound film, it also deprives the user of the possibility of subjecting such a film to double exposure or other cinematographic tricks calling for a change in the transport direction.

OBJECT OF THE INVENTION

The object of my present invention, therefore, is to provide means in such a dual-purpose camera for facilitating film reversals with both silent-film and sound-film cassettes.

SUMMARY OF THE INVENTION

In accordance with my present invention, a camera provided with reversible film-feeding means (including a reciprocable traction claw and a catch engageable with the hub of a takeup reel) comprises normally inactive windup-control means for modifying the operation of the catch during reciprocation of the traction claw to permit the accumulation of a reserve stretch of film within a silent-film cassette, downstream of the image gate, together with programming means for selectively activating the feed-control means preparatorily to and during a reversal of the film transport in the presence of such a silent-film cassette. A sensor adapted to discriminate between silent-film cassettes and sound-film cassettes coacts with the programmer to permit the activation of the windup-control means solely in the presence of a silent-film cassette, preventing such activation by partially disabling the programmer if the camera housing contains a sound-film cassette instead. The hub of such a sound-film cassette is engageable by release means in the camera housing, such as a spring-loaded stud, deactivating the rewind stop within the cassette so that rewinding becomes possible upon a reversal of the film transport; this eliminates the need for the storage of a reserve stretch of sound film and obviates the risk of damage to the film or the camera due to entanglement.

The modification of the operation of the windup catch for the accumulation of a reverse of silent film may involve either a slowdown or a complete stoppage of the takeup reel. For practical reasons, such as a more uniform loading of a drive motor, I prefer to use deceleration rather than standstill; such deceleration can be brought about in various ways, as by the interposition of a step-down mechanism between the catch and its drive, an intermittent deactivation of a stepping drive for the catch, or a switchover between two gear trains of different speed ratios. The inhibition of such deceleration under the control of the cassette sensor can be carried out both mechanically and electrically.

Since the hubs of silent-film cassettes normally do not have axial bores into which a stop-releasing stud can be inserted, the absence of such a bore will cause a repression of the stud against its spring force upon the loading of the camera with a silent-film cassette. In such an instance, therefore, the stud itself can be used as a cassette sensor for purposes of the present invention, i.e. for the partial disablement of a programmer used for film-transport reversals in trick cinematography.

BRIEF DESCRIPTION OF THE DRAWING

The above and other features of my invention will now be described in detail with reference to the accompanying drawing in which.

SPECIFIC DESCRIPTION

Figure 1:
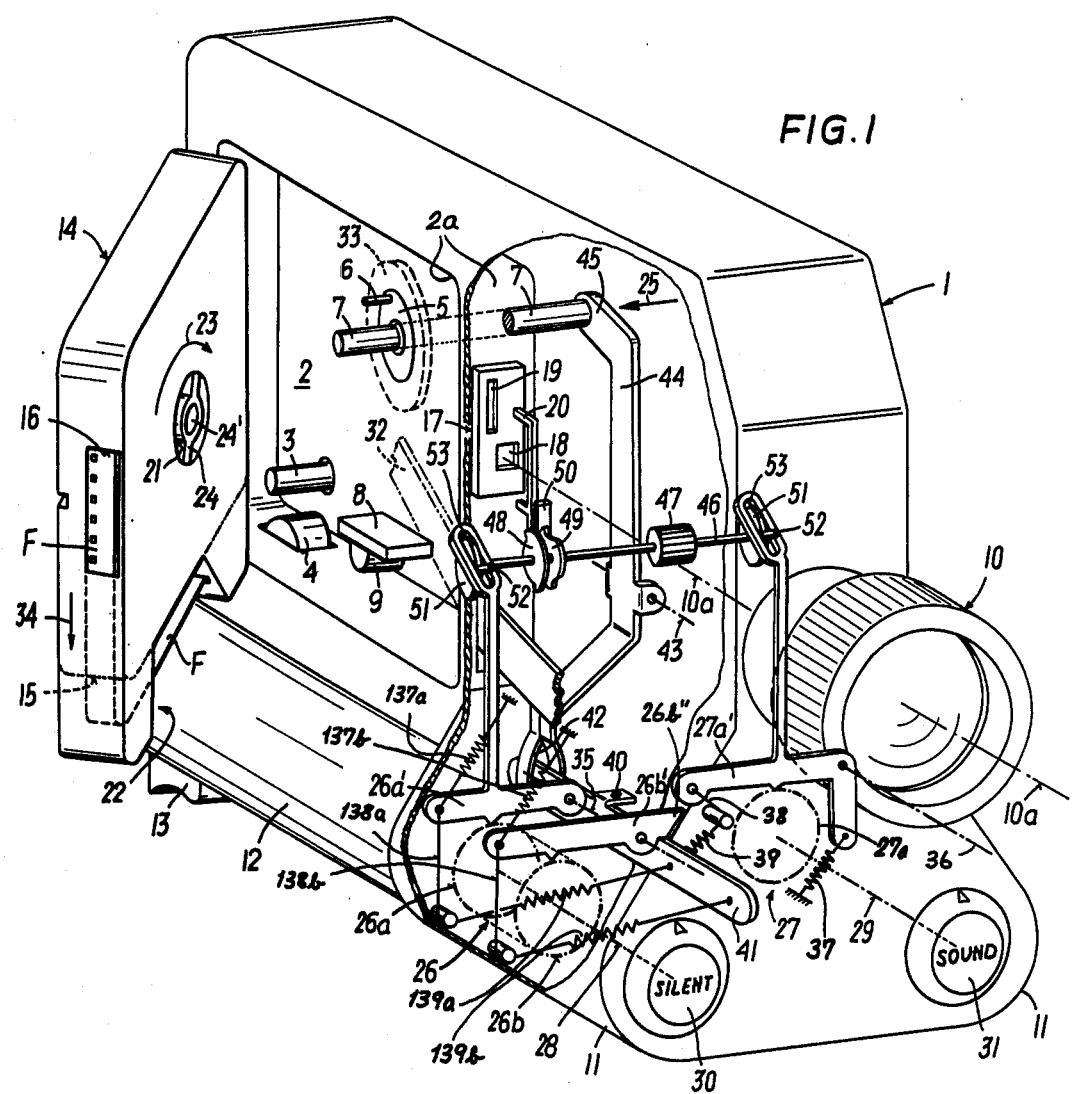
FIG. 1 is an axonometric view of a camera embodying my invention, with parts of the camera housing broken away to expose its internal construction.

In FIG. 1 I have shown a dual-purpose motion-picture camera whose housing 1 has a wall 2a forming a chamber 2 for the insertion of either a sound-film cassette 14 or a silent-film cassette 15 (diagrammatically indicated in dot-dash lines). As will be apparent, cassette 14 differs from cassette 15 by the presence of downwardly extending feet defining between them a cutout 22 which accommodates conventional sound-recording elements including a rotatable capstan 3, a pressure roller 4 adapted to clamp a film F against that capstan, a support plate 8 and a recording head 9 mounted thereon. Upon insertion into the camera, either type of cassette comes to rest on plate 8.

Each cassette has a window 16 which upon insertion confronts a film stage 17 within the camera that is provided with an image gate 18 and with a slot 19 for the perforation-engaging tooth of a vertically reciprocable traction claw 20. The drive mechanism for this traction claw includes a nonillustrated cam or crank for vertically reciprocating same and, synchronized therewith, a pair of juxtaposed cams 48 and 49 on a shaft 46 lodged in a pair of bearings 51. The cams 48 and 49, with humps relatively offset by 180°, alternately coact with a cam-follower lug 50 on claw 20 designed to deflect the claw through the slot 19 into engagement with the confronting film perforations on either the downward stroke for forward feed (as indicated by an arrow 34) or the upward stroke for reverse feed. Shaft 46, which is axially shiftable to align one or the other cam with lug 50 as more fully described hereinafter, is driven from a nonillustrated motor by way of a transmission of which only a cylindrical gear 47 has been shown.

An objective 10 on camera housing 1 has an optical axis 10a in line with image gate 18. The front end of housing 1 is provided, in the vicinity of this objective, with two bulges 11 accommodating a pair of selectors or programmers 26 and 27 for carrying out double exposures of silent films and sound films, respectively. A handgrip 12 rearwardly of these bulges carries a trigger 13 controlling the operation of the film drive.

Programmers 26 and 27 comprise respective control knobs 30 and 31 whose shafts 28 and 29 carry various cams of which only two cams 26a, 26b (in the case of programmer 26) and one cam 27a (in the case of programmer 27) have been illustrated. In the depicted home positions of these knobs, filming proceeds normally. In an off-normal position, the transport direction of the film is reversed preparatorily to a retake; knob 30 also has an intermediate position which it must pass prior to such reversal in order to accumulate a reserve of silent film, available for reverse feed, within a cassette 15. Further cams on shafts 28 and 29, not specifically shown, serve for the obstruction of the film gate by a shutter or a diaphragm during reverse feeding. The shafts and the cams of the two programmers have been represented only diagrammatically, by dot-dash lines, in order not to obscure other parts of the mechanism.

Coupled with the drive for the traction claw 20 is a pinion 54 (FIGS. 2 and 2A) whose tubular shaft 54' is keyed to a friction disk 55 which is axially pressed by a nonillustrated spring against a gear 33 in front thereof. Gear 33, idling on shaft 54', is integral with a disk 5 having a dog or catch 6 eccentrically positioned thereon, this dog projecting into a circular cutout 21 of an adjoining wall of a cassette 14 or 15 to entrain a hub 24 of a takeup reel in the cassette on which the film F is wound up during the taking of motion pictures. In the case of a sound-film cassette 14, hub 24 has a central bore 24' designed to receive a projecting extremity of a stud 7 which is slidably guided in pinion shaft 54' and is under outward axial spring pressure symbolized by an arrow 25. The corresponding hub of a silent-film cassette 15 lacks the central bore 24', thus repressing the stud 7 against its spring force.

Figure 1A:
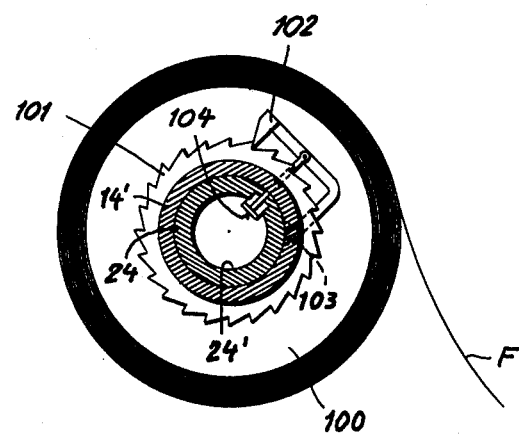
FIG. 1A is a sectional detail view of a takeup reel of a silent-film camera equipped with a releasable rewind-stop mechanism.

As illustrated in FIG. 1A, the takeup reel 100 of a sound-film cassette is rotatable with respect to a ratchet wheel 101 carried on a tubular formation 14' of the cassette 14 and coacts with a pawl 102 pivoted at 103 to the hub 24. A leaf spring 104, normally projecting from a recess in hub 24 into its bore 24', biases the pawl 102 into engagement with ratchet wheel 101 to prevent reverse rotation of reel 100. Upon the introduction of stud 7 into bore 24', spring 104 is forced back into its recess to disengage the rewind-stopping pawl 102 from the ratchet teeth. This decoupling action allows the film F to be rewound within the camera, against the direction of arrow 34, upon reversal of the transport motion of traction claw 20 by a switchover from cam 49 to cam 48. The rotation of capstan 3 need not be reversed if pressure roller 4 is separated therefrom at that stage. With the release of the rewind stop within cassette 14, hub 24 is free to turn against its normal direction of rotation (indicated by an arrow 23) with entrainment of dog 6, disk 5 and gear 33 against the frictional resistance of disk 55 (FIGS. 2 and 2A) which may continue to rotate in its original direction. If desired, however, programmer 27 can be equipped with an additional cam for decoupling or reversing the drive of friction disk 55 during rewinding of a sound film within a cassette 14.

The axial shifting of cam shaft 46 for a switchover between forward and reverse feed is effected, under the control of programming knob 30 or 31, with the aid of a pair of levers 26a' and 27a' respectively coacting with cams 26a and 27a. These two levers support a pair of mountings 52, 53 for the bearings 51 of shaft 46 which in their illustrated normal position keep the forward-feed cam 49 aligned with claw 20. Lever 26a' and a similar lever 26a', coacting with cam 26b, are fulcrumed on an axis 35 and are biased by springs 137a, 137b in a clockwise direction, i.e. away from their respective cams. The corresponding lever 27a', fulcrumed on an axis 36 and coacting with cam 27a, is similarly biased in a clockwise sense by a spring 37. A pair of flexible links 138a, 138b, advantageously represented by the cores of Bowden cables, are anchored via tension springs 139a, 139b to a forward extremity of an arm 41 which is horizontally swingable about a fulcrum 40. A similar link 38 connects the same extremity of arm 41, through a tension spring 39, with lever 27a'. The opposite extremity of arm 41 is straddled by a fork 42 on the bottom end of a lever 44 having a horizontal pivotal axis 43; the upper end 45 of this lever supports the stud 7 and is thus under the aforementioned spring pressure (arrow 25) tending to hold the arm 41 in its illustrated position, with its forward extremity closer to shaft 28 than to shaft 29, whereby spring 39 is stressed sufficiently to override the tension of counteracting spring 37 whereas spring 139a is slackened so as to be substantially balanced by spring 137a; thus, lever 26a' readily follows the motions of lever 27a' under the control of cam 27a when knob 31 is rotated into its alternate position. With knobs 30 and 31 both in their home positions, as shown, the humps of levers 26a', 26b' and 27a' all ride on low dwells of their respective cams; shaft 46 is at the left-hand end of its stroke while the forward extremity of arm 41 engages a beveled extension 26b'' of lever 26b' whereby knob 30 is prevented from being rotated into its next (intermediate) position in which a high dwell of cam 26b would swing that lever in a clockwise sense against the force of spring 139b. It should be observed that this situation exists as long as no silent-film cassette 15 is loaded into the camera, i.e. when the camera housing is empty or contains a sound-film cassette 14.

Figure 2:
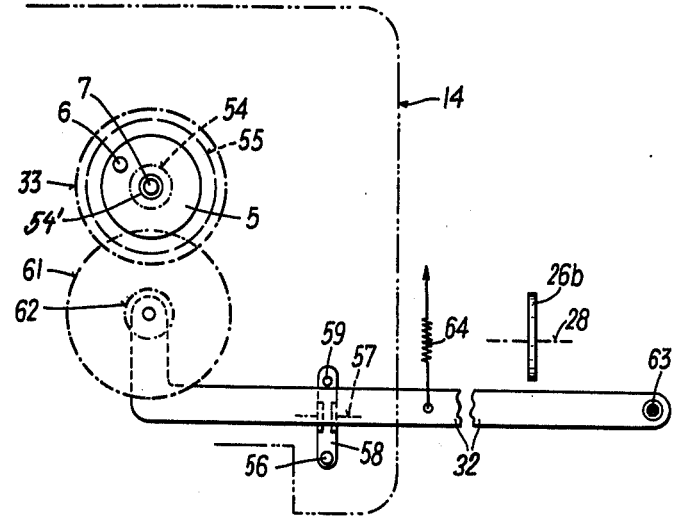
FIG. 2 is a somewhat schematic elevational view of a step-down transmission forming part of a modified camera generally similar to that of FIG. 1.
Figure 2A:
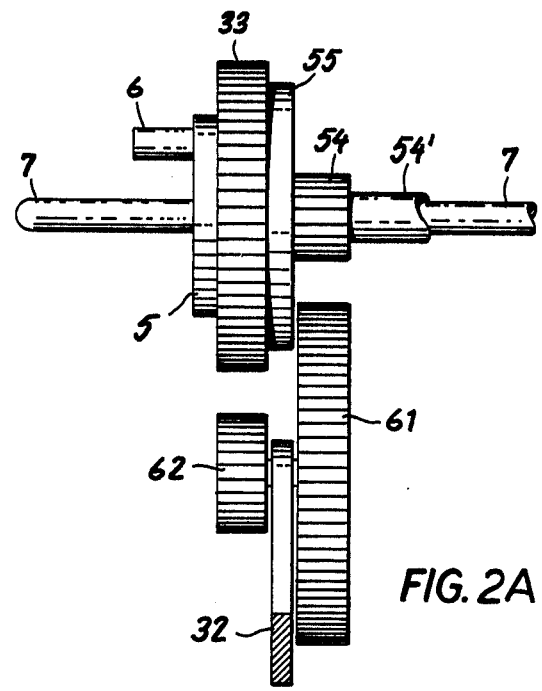
FIG. 2A is a side view of the transmission shown in FIG. 2.

Lever 26b' is coupled with an arm 32 that is only partly shown in FIG. 1 but has been more fully illustrated in FIG. 2 (which, however, represents a somewhat different camming assembly for the control of that arm). One end of that arm, as shown at 63 in FIG. 2, is pivoted on the camera housing whereas its opposite, free end carries a gear 61 and a pinion 62 rigid therewith as also illustrated in FIG. 2A. Gear 61 is engageable with pinion 54 while pinion 62 goes into mesh with gear 33 when the arm 32 is swung clockwise from its normal position. In that event the gear train 54, 61, 62, 33 constitutes a step-down transmission through which the disk 5 with its dog 6 is driven at a greatly reduced rate, compared with its normal rotation through frictional entrainment of gear 33 by disk 55. Because of the blocking of lever 26b' by arm 41 in the position shown in FIG. 1, that intermediate position cannot be established in the absence of a silent-film cassette.

Thus, whenever a sound-film cassette 14 has been inserted, the user can operate only the selector knob 31 for the purpose of first reversing and then rerunning a stretch of film already exposed. When the knob 31 is moved into its reverse-feed position, cam 27a rotates the lever 27a' clockwise to shift the shaft 46 to the right, thereby aligning the cam 48 in lieu of the cam 49 with traction claw 20. After the desired length of film has been run backward, knob 31 is restored to its home position and the second exposure proceeds normally, continuing beyond the twice-exposed film section.

If silent-film cassette 15 is used in place of cassette 14, the repression of stud 7 swings the lever 44 clockwise about its fulcrum 43 and disengages the forward extremity of arm 41 from the extension 26b'' of lever 26b'. The relative tensioning of spring 139a and relaxation of spring 39, resulting from the displacement of arm 41, makes lever 26a' a positive follower of cam 26a while the spring forces now acting directly on lever 27a' are substantially in balance. Upon rotation of knob 30 into its intermediate position, cam 26b swings the lever 26b' clockwise to drive the arm 32 in the same direction, thereby causing the aforedescribed slowdown of the windup movement of disk 5 and allowing a stretch of film F to accumulate within cassette 15. Next, knob 30 is advanced into its reverse position in which a lifting of lever 26a' by cam 26a causes the same rightward shift to shaft 46 as the displacement of lever 27a' by cam 27a under the control of knob 31. With return of knob 30 to its starting or home position, the previous conditions are restored and normal filming can resume.

In the system of FIG. 2 I use only one programmer, e.g. the one controlled by knob 30 in FIG. 1, with both sound-film and silent-film cassettes. Arm 32 is here shown controlled directly by the cam 26b on shaft 28 which in this instance lies above that arm; a spring 64 biases the free end of arm 32, carrying the step-down gears 61 and 62, upwardly toward shaft 54'. A two-arm lever 58, swingable about a horizontal axis 57, carries at its lower end a stud 56, acting as a cassette feeler, and at its upper end a pin 59 normally biased by gravity or a spring to clear the arm 32. When a sound-film cassette 14 is inserted into chamber 2 (FIG. 1), as indicated in dot-dash lines in FIG. 2, feeler 56 is repressed by one of the cassette feet to let the pin 59 overhang the arm 32 which at this instance is held down by cam 26b as knob 30 occupies its home position. Though in this case the knob can be rotated into its intermediate position, no retardation of windup will take place inasmuch as pin 59 prevents the gears 61, 62 from rising into engagement with gears 54, 33 when a low dwell of cam 26b confronts the arm 32. Thus, a slowing of the rotation of the hub-entraining disk 5 can occur only if the cassette is of the silent-film type, lacking a foot at the location of stud 56.

Figure 3:
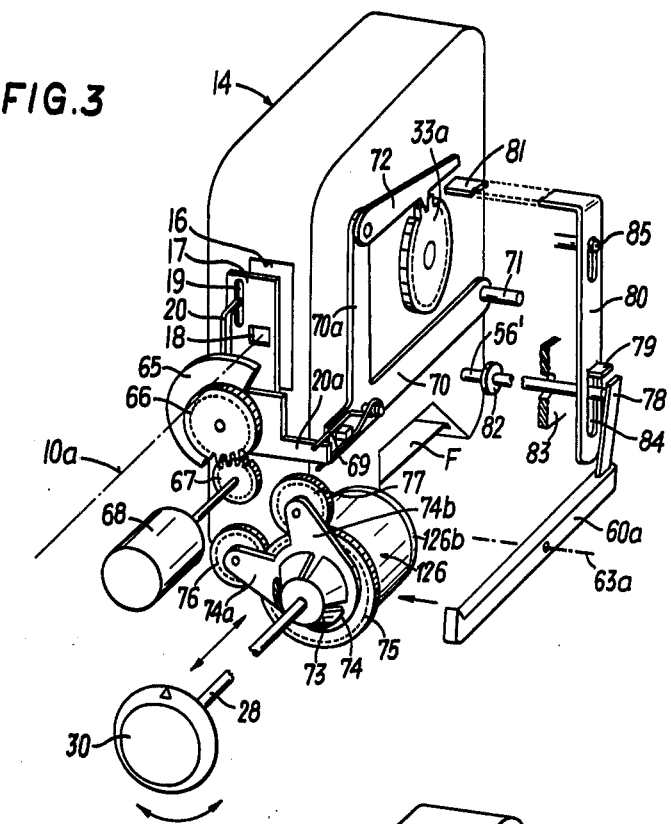
FIG. 3 is an exploded axonometric view of certain components of another camera according to my invention.

FIG. 3 depicts a further embodiment where the traction claw 20 is driven, through nonillustrated cams, by a motor 68 whose output shaft carries a pinion 67 in mesh with a gear 66, the latter being integral with a sectoral shutter 65 periodically intersecting the objective axis 10a to obstruct the image gate 18. The reciprocation of claw 20 is communicated, through an extension 20a thereof embraced by a hairpin spring 69, to a lever 70 having a fulcrum 71 and an extension 70a articulated to a pawl 72. The latter coacts with a ratchet wheel 33a, replacing the gear 33 of the preceding Figures, which drives the hub of a takeup reel of a cassette 14 (or 15) in the aforedescribed manner.

The control knob 30 of the sole programmer used in this embodiment is both rotatable and axially shiftable. Its shaft 28 supports a Belleville spring 73, fixedly secured thereto, as well as a cam 126b forming part of a modified programmer 126. That programmer further includes a gear 75, juxtaposed with cam 126b, and a carrier 74, all freely rotatable on shaft 28. Two pinions 76 and 77, on respective arms 74a, 74b of carrier 74, are in permanent mesh with gear 75 and are selectively engageable with gear 67 upon rotation of the knob 30 from its illustrated normal position to the right or to the left after that knob has been pushed inward to align these pinions with gear 67. The axial shift of knob 30 and shaft 28 establishes frictional contact between carrier 74 and Belleville spring 73; cam 126b, suitably coupled with gear 75, is thus set in rotation by the motor 68 when the trigger 13 (FIG. 1) is pressed. Depending upon the direction of rotation of knob 30 from its normal position, traction claw 20 transports the film either forward or backward under the control of another cam on shaft 28 as described above.

Cam 126b coacts with a lever 60a having a pivotal axis 63a and terminating in a resilient tongue 78 bearing upon a cassette feeler 56' which, like feeler 56 in FIG. 2, confronts a foot of a sound-film cassette 14 lodged in the camera. Feeler 56' is guided in a wall 83 of the camera housing and has a shoulder 82 adjacent another wall portion, not shown, which limits its displacement. The end of feeler 56' remote from the cassette chamber 2

(FIG. 1) traverses a vertical slot 84 in a slider 80, guided by a fixed pin 85, which has a lug 79 overhanging the tongue 78 and further has a horizontal extension 81 underlying the tip of stepping pawl 72. In the presence of a sound-film cassette 14, feeler 56' is repressed as shown and deflects the tongue 78 away from lug 79 so that oscillations of lever 60a about its fulcrum 63a, brought about by cam 126b upon actuation of selector knob 30 as described above, will be ineffectual.

If, however, cassette 14 is replaced by a silent-film cassette which does not repress the feeler 56', tongue 78 remains aligned with lug 79 whereupon extension 81 of slider 80 periodically lifts the pawl 72 out of engagement with ratchet wheel 33a whenever cam 126b is driven, i.e. when the user carries out a program for double exposure initiated by a slow windup of the film during forward feed and during subsequent reverse feed. In this instance, therefore, the program involves the steps of (a) depressing the knob 30, (b) rotating the depressed knob in one direction, e.g. clockwise, to continue forward feeding while accumulating a reserve of exposed film within a cassette 15 indicated in FIG. 1, (c) rotating the depressed knob in the opposite direction—thus, counterclockwise—to rewind some or all of the accumulated film on its supply reel within the cassette, and (d) turning the knob back into its normal rotary position before retracting it to resume regular operation. During steps (b) and (c), the intermittent disengagement of pawl 72 by slider 80 reduces the windup rate of the film in a silent-film cassette 15; no such reduction occurs in the presence of a sound-film cassette 14. A stop-releasing stud 7 (cf. FIGS. 1 and 2), passing centrally through gear 33a and through an adjacent friction disk (not shown) carrying the dog 6, has not been illustrated.

Figure 4:
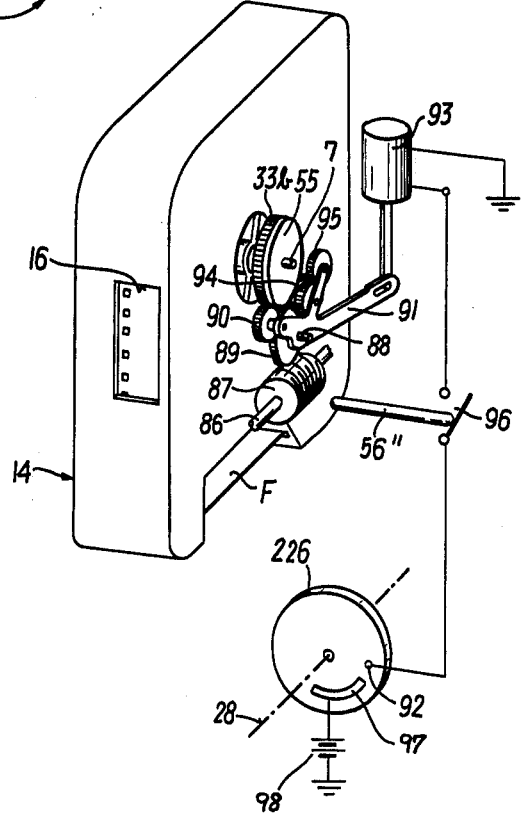
FIG. 4 is a somewhat diagrammatic view similar to that of FIG. 3, illustrating a further embodiment.

In FIG. 4 I have shown the friction disk 55, traversed by the stud 7, disposed next to a gear 33b which is freely rotatable on the disk shaft to which the disk 5 (FIGS. 1 and 2) carrying the dog 6 is also secured (a similar arrangement could be used in FIG. 3). A stationary axle 88 supports a carrier 91, in the shape of a three-armed lever, as well as a gear 89 driven by a worm 87 on the shaft 86 of a nonillustrated motor. One of the arms of lever 91 carries a pinion 90 in permanent mesh with gear 89 and also normally in engagement with gear 33b. A second arm carries a speed-reducing gear train including two stepped gears 94, 95 through which the rotation of gear 89 is transmitted at a greatly decreased rate to gear 33b when the latter is engaged by the smaller-radius step of gear 95 in an alternate position. The third arm of carrier 91 is linked with the core of a solenoid 93 establishing that alternate position when a silent film is subjected to double exposure; the energizing circuit of solenoid 93 includes a conductor strip 97 on an otherwise nonconductive disk 226 secured to the shaft 28 of control knob 30 (FIGS. 1 and 3). A brush 92 contacts the strip 97 when the control knob is rotated into its off-normal positions, for accumulation and reverse feed, thereby connecting the solenoid across a battery 98 unless a sound-film cassette 14 is present in the camera. A circuit breaker 96 in series with solenoid 93 is opened, via a cassette feeler 56", upon insertion of such a sound-film cassette to prevent switchover from the normal windup drive, including pinion 90, to the alternate drive including step-down transmission 94, 95.

I claim:

1. In a motion-picture camera provided with a housing accommodating silent-film cassettes and sound-film cassettes, each cassette being provided with a takeup reel having an externally accessible hub and rewind-stop means for preventing reverse rotation of said takeup reel, the combination therewith of:

reversible film-feeding means in said housing including a reciprocable traction claw engageable with an accessible film portion on either type of cassette moving past an image gate of said housing, said film-feeding means further including catch means engageable with the hub of an inserted cassette for entraining the takeup reel thereof;

release means in said housing engageable with the hub of a sound-film cassette for deactivating said rewind-stop means thereof;

normally inactive windup-control means for at least reducing the operating speed of said catch means during reciprocation of said traction claw to permit the accumulation of a reserve stretch of film within a silent-film cassette downstream of said image gate;

programming means selectively settable into a first condition for operating said film-feeding means in a forward direction with said windup-control means deactivated, a second condition for operating said film-feeding means in said forward direction with said windup-control means activated, and a third condition for operating said film-feeding means in a backward direction; and sensing means in said housing adapted to discriminate between silent-film cassettes and sound-film cassettes for partially disabling said programming means to prevent the activation of said windup-control means in the presence of a sound-film cassette.

2. The combination defined in claim 1 wherein said windup-control means comprises a step-down mechanism for slowing the entrainment of said hub by said catch means.

3. The combination defined in claim 2 wherein said catch means comprises a rotatable member frictionally coupled with a driving element therefor, said step-down mechanism including gear means engageable with said rotatable member and said driving element for positively interconnecting same.

4. The combination defined in claim 2 wherein said catch means comprises a rotatable member coupled via a stepping drive with said traction claw, said step-down mechanism including decoupling means controlled by said sensing means for intermittently deactivating said stepping drive in the absence of a sound-film cassette.

5. The combination defined in claim 2 wherein said catch means comprises a rotatable member and a driving element therefor, said film-feeding means including a first gear train normally coupling said rotatable member with said driving element, said windup-control means including a second gear train interposable between said rotatable member and said driving element in place of said first gear train.

6. The combination defined in claim 1 wherein said sensing means comprises a spring-loaded stud receivable in the hub of a sound-film cassette but blocked by the hub of a silent-film cassette, said sensing means being a linkage coupled with said stud.

7. The combination defined in claim 1 wherein said sensing means comprises a stop mechanically blocking the activation of said windup-control means.

8. The combination defined in claim 1 wherein said sensing means comprises a switch in an operating circuit for said windup-control means.

9. The combination defined in claim 4 wherein said decoupling means comprises an oscillatable linkage including two coacting elements, said sensing means being effective to disengage said elements from each other in the presence of a sound-film cassette.

10. The combination defined in claim 7 wherein said programming means comprises two independently movable selectors normally establishing said first condition, one of said selectors being manually switchable directly from said first condition to said third condition, the other of said selectors being manually switchable from said first condition to said third condition only by way of said second condition, said other of said selectors being blocked by said stop in the absence of a silent-film cassette.

11. In a motion-picture camera provided with a housing accommodating silent-film cassettes and sound-film cassettes, each cassette being provided with a takeup reel having an externally accessible hub and rewind-stop means for preventing reverse rotation of said takeup reel, the combination therewith of:
  reversible film-feeding means in said housing including a reciprocable traction claw engageable with an accessible film portion on either type of cassette moving past an image gate of said housing, said film-feeding means further including catch means engageable with the hub of an inserted cassette for entraining the takeup reel thereof;
  release means in said housing engageable with the hub of a sound-film cassette for deactivating said rewind-stop means thereof;
  normally inactive windup-control means for at least reducing the operating speed of said catch means during reciprocation of said traction claw to permit the accumulation of a reserve stretch of film within a silent-film cassette downstream of said image gate;
  programming means selectively settable into a first condition for operating said film-feeding means in a forward direction with said windup-control means deactivated, a second conditon for operating said film-feeding means in said forward direction with said windup-control means activated, and a third condition for operating said film-feeding means in a backward direction;
  releasable coupling means inserted between said windup-control means and said programming means; and
  sensing means in said housing adapted to discriminate between silent-film cassettes and sound-film cassettes, said sensing means being operatively connected with said coupling means for releasing same in the presence of a sound-film cassette.

* * * * *